May 7, 1968 D. A. COOPER Re. 26,388

FRAMEWORK COVERING ARRANGEMENT

Original Filed June 22, 1959

*INVENTOR.*
DANIEL A. COOPER
*BY* Richard F. Carr
ATTORNEY

United States Patent Office

Re. 26,388
Reissued May 7, 1968

26,388

FRAMEWORK COVERING ARRANGEMENT

Daniel A. Cooper, Van Nuys, Calif., assignor to Cooper Engineering Co., Van Nuys, Calif., a corporation of California Original No. 3,127,136, dated Mar. 31, 1964, Ser. No. 821,958, June 22, 1959. Application for reissue Aug. 22, 1966, Ser. No. 587,351
6 Claims. (Cl. 244—133)

Matter enclosed in heavy brackets [ ] appears in the original patent but forms no part of this reissue specification; matter printed in italics indicates the additions made by reissue.

*ABSTRACT OF THE DISCLOSURE*

*A framework covering arrangement in which a heat-shrinkable cloth is disposed over a framework and then shrunk by the application of heat to localized areas throughout the material, after which a substance is applied to the material rendering it impervious to the passage of air.*

Figure 1:
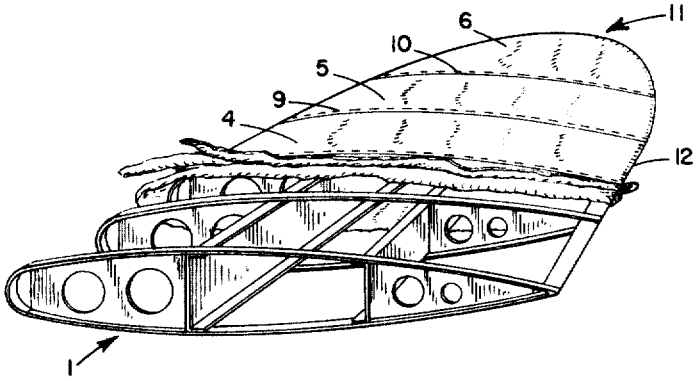

This invention pertains to an arrangement for covering framework and more particularly to the provision of a cloth covering on an airframe.

Many aircraft are constructed of a framework which is covered by cloth material which is in turn coated with several layers of dope. Normally the cloth used for covering an air frame is made of cotton fibers with the cloth sections suitably stitched together and fastened to the framework of the airplane. The procedure for cloth covering of aircraft has varied little from the early days of aviation. Of primary importance is the careful application of several layers of dope after the fabric has been placed over the airframe. This acts to shrink the cloth so that it is taut over the airframe, as well as to provide a sealed surface impervious to air. The shrinkage obtainable with dope is somewhat limited, and caution must be exerted to assure that the cloth as nearly as possible conforms to the exact shape of the airframe so that a taut surface will be obtained. Thus, the covering process becomes a very time consuming operation. In addition, the cotton material deteriorates rather rapidly and is adversely affected by dampness, strong sun, and various other weathering conditions. This means that periodically the covering must be removed from the airframe and replaced with a new fabric layer. In other words, the exterior surface of the airframe must be completely remanufactured from time to time.

Recently it has been suggested that cloth made of glass fibers be utilized as an aircraft covering material in order to avoid the deterioration from weathering encountered with cotton material. Glass cloth, however, is an exceptionally expensive material which has severely limited its use as an aircraft covering. In addition, glass cloth must be installed with caution because of its characteristic early failure from fatigue upon flexure. It has been necessary to apply the glass cloth over an under layer of cotton fabric or plastic, which therefore actually has required covering the airframe twice. This also means that the weight of the aircraft is increased. Moreover, it is imperative that the airframe be recovered whenever the underlying layer has deteriorated below fifty percent of its original strength in order that the glass cloth may have adequate backing.

The provisions of this invention overcome the shortcomings outlined above by the use of a heat shrinkable synthetic fabric offering distinct advantages in strength, durability and ease of application.

Therefore, it is an object of this invention to provide a strong, durable, and light weight covering for a framework.

Another object of this invention is to provide a framework covering arrangement which is not adversely affected by weathering conditions.

A further object of this invention is to provide an arrangement for applying fabric to an aircraft in a very short time.

An additional object of this invention is to provide an aircraft covering arrangement which is not subject to failure from flexure, and which requires no underlying backing material.

Yet another object of this invention is to provide an arrangement for covering a framework with a material capable of a large amount of shrinkage upon the application of heat.

Figure 2:
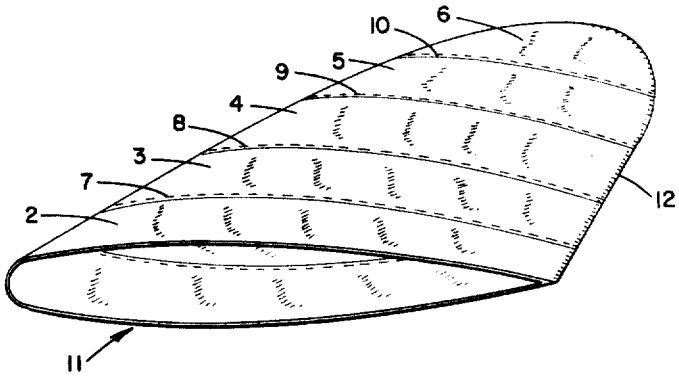
Figure 3:
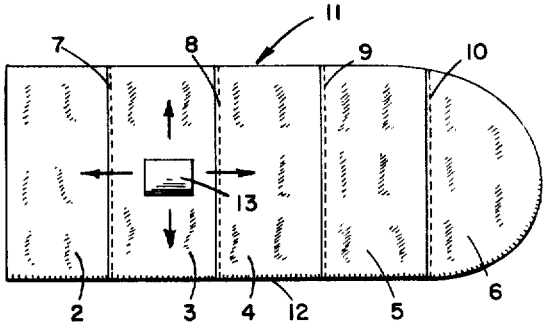
Figure 4:
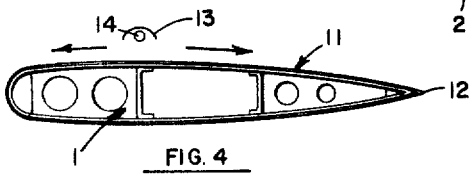
Figure 5:
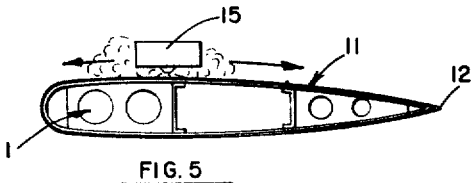

These and other objects will become apparent from the following detailed description taken in connection with the accompanying drawing in which:

FIG. 1 is a perspective view of an aircraft wing with a fabric layer partially installed thereon, FIG. 2 is a perspective view of the fabric envelope prior to being drawn over the wing, FIG. 3 is a top plan view of the covered wing illustrating the progressive local application of heat, FIG. 4 is an end elevational view of the arrangement of FIG. 3, and FIG. 5 is a view similar to FIG. 4 showing the use of an alternate source of heat.

With reference to the drawing, there may be seen in FIG. 1 a typical framework 1 of a wing of an aircraft, which must be covered with fabric to provide the outer layer of this member. Whether this framework is being covered for the first time, or if it is to be re-covered, it will be separated from the remaining portions of the airframe as illustrated. For re-covering, of course, the worn out layer of cloth is removed prior to applying a new layer of cloth. While the covering of only a wing portion of the aircraft is shown here as an example, the procedure for covering for the remainder of the airframe is the same. Moreover, the teachings of this invention are equally applicable for providing a cloth covering on any kind of object whether or not associated with an aircraft.

The fabric covering process utilized in connection with this invention may embody either the envelope-type of covering or the blanket-type of procedure such as described in detail in "Civil Aeronautics Manual 18," second edition, revised February 1957, published by the Civil Aeronautics Administration. Additional information may be found in the book, "Aircraft Maintenance and Repair" by the Technical Development Staff of Northrop Aeronautical Institute, published by McGraw-Hill Book Co., Inc., 1955.

In general, for the envelope-type of covering, several cloth strips, 2, 3, 4, 5, and 6 are sewn together along seams 6, 7, 8, and 9 to provide a large sheet of material which is somewhat bigger than the framework to be covered. The resulting sheet 11 is doubled over and outlined to the shape of the framework, then trimmed and sewn along edge 12 to define a receptacle or envelope as seen in FIG. 2. This envelope is drawn over the framework of the wing or other object to be covered. In the illustration of FIG. 1 the fabric envelope is in an intermediate position, partially over the frame of the wing. After the envelope 10 is received on the framework, it is suitably secured thereto such as by stitching or by auxiliary means.

According to the provisions of this invention, the fabric used in covering the frame is of a heat shrinkable type. In other words, the covering material simply is heated to conform it to the object covered. Thus, when the fabric has been brought over the framework of wing 1, its temperature is raised in order to provide the necessary shrinkage to tauten the fabric, without reliance upon numerous coats of dope to achieve this effect. It is preferred to use a cloth woven from a synthetic fiber made by the condensation of dimethyl terephthalate and ethylene glycol. A material of this type is marketed under the trademark "Dacron" by E. I. du Pont de Nemours & Co., Wilmington 98, Delaware. While normally the fabric produced from such fiber will be preshrunk at the mill for the conventional uses of the material, it is important to obtain the material as produced and without any such preshrinkage.

In applying the heat to the fabric over the framework, it is preferred to utilize local applications of heat made progressively over the entire area of the fabric. This may be, for example, by a hand held radiant heater moved parallel to and closely adjacent the fabric as illustrated in FIGS. 3 and 4. The heater 13, which may include a suitable resistance element 14, is moved back and forth first in one direction, and then through similar strokes in a direction at 90° with respect thereto to assure that complete coverage of the fabric surface is obtained. In order to preclude any possibility of damage to the fabric or to the structure or operative elements beneath the surface of the fabric, it is preferred to provide a maximum exposure to the heating element of two seconds at any location.

Normally, fully adequate shrinkage will be realized if the fabric is heated to from 200° F. to 225° F. Any heater of sufficient capacity may be calibrated to provide these results by determining the temperature it produces at a particular distance from it. For example, a 650 watt resistance heater of ordinary design gives such a temperature range a distance of approximately two inches.

While sufficient shrinkage of the material normally takes place with one application of heat of the magnitude noted above, for certain larger areas of fabric surface it may be necessary to apply the heat in two or even three steps to obtain sufficient shrinkage. Better results are obtained if shrinkage is obtained gradually and in steps in this manner rather than if large amounts of shrinkage are realized in a single application of heat for a prolonged period of time. In addition, where necessary, added heat may be applied to the fabric to give even more shrinkage. Generally, however, it is preferred not to go above 400° F. to avoid injury to the fabric or the airframe. In no event should a temperature of 450° F. be exceeded with the fabric described above, because above that value the fabric will melt and become permanently damaged.

For an alternate source of heat for shrinking the fabric, a suitable steam generator 15 may be utilized as shown in FIG. 5. The temperature of the steam will shrink the material adequately, and will assure that excessive temperatures never are reached. An ordinary steam iron may be used as a source of steam for this purpose. At altitudes of above 3,000 feet, however, the temperature of steam is insufficient, and some other source of heat must be utilized.

After the fabric has been tautened by the application of heat, it may be finished in any desired conventional manner. Basically, however, the finishing is only to render the cloth surface impervious to air. It is not necessary to apply numerous coatings of dope because the shrinkage has been obtained through the application of heat, and the dope is not relied upon for this purpose. The labor involved in covering the airframe accordingly is reduced greatly. It is possible to obtain some additional shrinkage of the material by application of a suitable dope, such as a nitrate dope, but normally such shrinkage is neither necessary nor desirable.

Extremely high shrinkage values may be obtained by using the heat shrinkable fabric described above. This material will shrink around 10% when raised to 400° F. Such a large amount of shrinkage simplifies the construction of the envelope or blanket utilized to cover the structure by enabling the fabric to be made taut even though relatively loose when installed. This lessens the care necessary in making the fabric layer.

The resulting fabric coating is lightweight and durable, giving exceptionally high strength values. It is almost chemically inert and will resist weathering in such a manner that it will last three times the life of a cotton fabric coating of conventional type. In fact, with proper care it is possible to provide a covering on an airframe which will last the lifetime of the airplane. Extremes in temperature will not harm the covering of this invention, whether the values are down as low as —70° F. or as high as those encountered in the desert. While the fabric shrinks upon the application of heat, no undesired shrinkage will take place in the temperature range of the ambient conditions in which the aircraft will be operated. The fabric used will shrink only when raised to temperatures above the range encountered by operation of any aircraft.

Of course, sources of heat other than those described above may be utilized to shrink the fabric, transmitting heat by conduction, convection or radiation, or a combination of these effects.

It is apparent from the foregoing, therefore, that the improved fabric coating arrangement of this invention is superior to the practices known in the prior art giving a coating of lightweight, superior strength, and durability to weather, flexure or other factors. It is exceptionally easy to apply the fabric to any framework and to tauten it, greatly reducing the time necessary with conventional procedures.

The foregoing detailed description is to be clearly understood as given by way of illustration and example only, the spirt and scope of this invention being limited solely by the appended claims.

I claim:

1. The method of covering an airframe comprising the steps of forming an envelope of cloth material shrinkable at an elevated temperature, placing said envelope over a portion of an airframe to be covered so that said airframe portion is received within said envelope *and surrounded by a single layer of said cloth material,* then attaching said envelope to said air frame, then applying heat to localized areas of said envelope progressively throughout said envelope sufficient to cause said envelope to shrink and become taut on said airframe portion, and then applying a substance to said material to cause said envelope to become substantially fluid impervious.

[2. The method of covering an airframe comprising the steps of disposing over said airframe and attaching thereto a heat shrinkable cloth material of synthetic fiber made by the condensation of dimethyl terephthalate and ethylene glycol, then raising the temperature of localized areas progressively throughout said cloth to the range of about 200° F. to about 450° F. for a time sufficient to shrink said cloth and cause the same to become taut on said airframe, and then applying to said cloth a substance to render said cloth substantially impervious to the passage of air.]

3. The method of covering a framework comprising the steps of attaching to said framework a layer of heat shrinkable cloth consisting of synthetic fibers made by the condensation of dimethyl terephthalate and ethylene glycol, disposing a radiant heater adjacent a localized area of said cloth in a manner sufficient to raise the temperature of said cloth to the shrinking range but without causing damage thereto, and moving said source of heat about over said cloth in such manner so as to progressively raise all portions thereof to said heat shrinkage range and to give all portions of said cloth a maximum exposure to said radiant heater of about two seconds.

[4. The method of providing a cover on an airframe comprising the steps of disposing over said airframe and attaching thereto an unexpanded synthetic cloth material shrinkable at elevated temperatures, then raising the temperature of a localized area of said cloth material sufficient to cause shrinkage at said area, then progressively raising the temperature of localized areas throughout the remainder of said cloth material sufficient to cause shrinkage of said remaining areas and cause said material to become taut on said airframe, and then applying to said cloth material a substance to render said material substantially impervious to the passage of air.]

5. The method as recited in claim [4] *8* in which for raising the temperature of said localized areas steam is impinged upon the surface of said material at said areas.

6. The method of covering an object comprising the steps of disposing over said object an unexpanded heat-shrinkable cloth material of synthetic fiber made by the condensation of dimethyl terephthalate and ethylene glycol, securing marginal portions of said cloth material to said object, then raising the temperature of localized areas progressively throughout said cloth to the range of about 200° F. to about 450° F. for a time sufficient to shrink said cloth and cause the same to become taut on said object, and then applying a finish coat of sealant material to said cloth.

*7. The method of providing a covered airframe comprising the steps of disposing over an airframe and attaching thereto a single layer of heat-shrinkable cloth material of synthetic fiber made by the condensation of dimethyl terephthalate and ethylene glycol, then raising the temperature of localized areas progressively throughout said single layer of cloth to the range of about 200° F. to about 450° F. for a time sufficient to shrink said cloth and cause the same to become taut on said airframe, then applying only to said single layer of cloth a substance to render said single layer of cloth substantially impervious to the passage of air, and then employing said single layer with said substance so applied thereto as the sole exterior covering on said airframe.*

*8. The method of providing a cover on an airframe*

*comprising the steps of disposing over said airframe and attaching thereto a single layer of unexpanded synthetic cloth material shrinkable at elevated temperatures, then raising the temperature of a localized area of said single layer of cloth material sufficient to cause shrinkage at said area, then progressively raising the temperature of localized areas throughout the remainder of said cloth material sufficient to cause shrinkage of said remaining areas and cause said material to become taut on said airframe, then applying to said single layer of cloth material a fluid substance of the type which is capable of solidifying to become substantially impervious to the passage of air, and then solidifying said substance while maintaining said cloth material as the sole covering on said airframe so as to provide a lightweight nonlaminated cloth covering on said airframe.*

References Cited

The following references, cited by the Examiner, are of record in the patented file of this patent or the original patent.

UNITED STATES PATENTS

| | | | |
|---|---|---|---|
| 2,155,931 | 4/1939 | Daneman. | |
| 2,356,927 | 8/1944 | Grossman. | |
| 2,356,948 | 8/1944 | Reed. | |
| 2,396,712 | 3/1946 | Luttge. | |
| 2,474,375 | 6/1949 | Shearer. | |
| 2,538,025 | 1/1951 | Moore. | |
| 2,650,213 | 8/1953 | Hofrichter. | |
| 2,828,799 | 4/1958 | Harrison. | |
| 3,140,846 | 7/1964 | Lott | 244—133 |

MILTON BUCHLER, *Primary Examiner.*

B. BELKIN, *Assistant Examiner.*